Dec. 17, 1940. E. H. ARMSTRONG Re. 21,660
FREQUENCY MODULATION SIGNALING SYSTEM
Original Filed Feb. 19, 1940 6 Sheets-Sheet 1
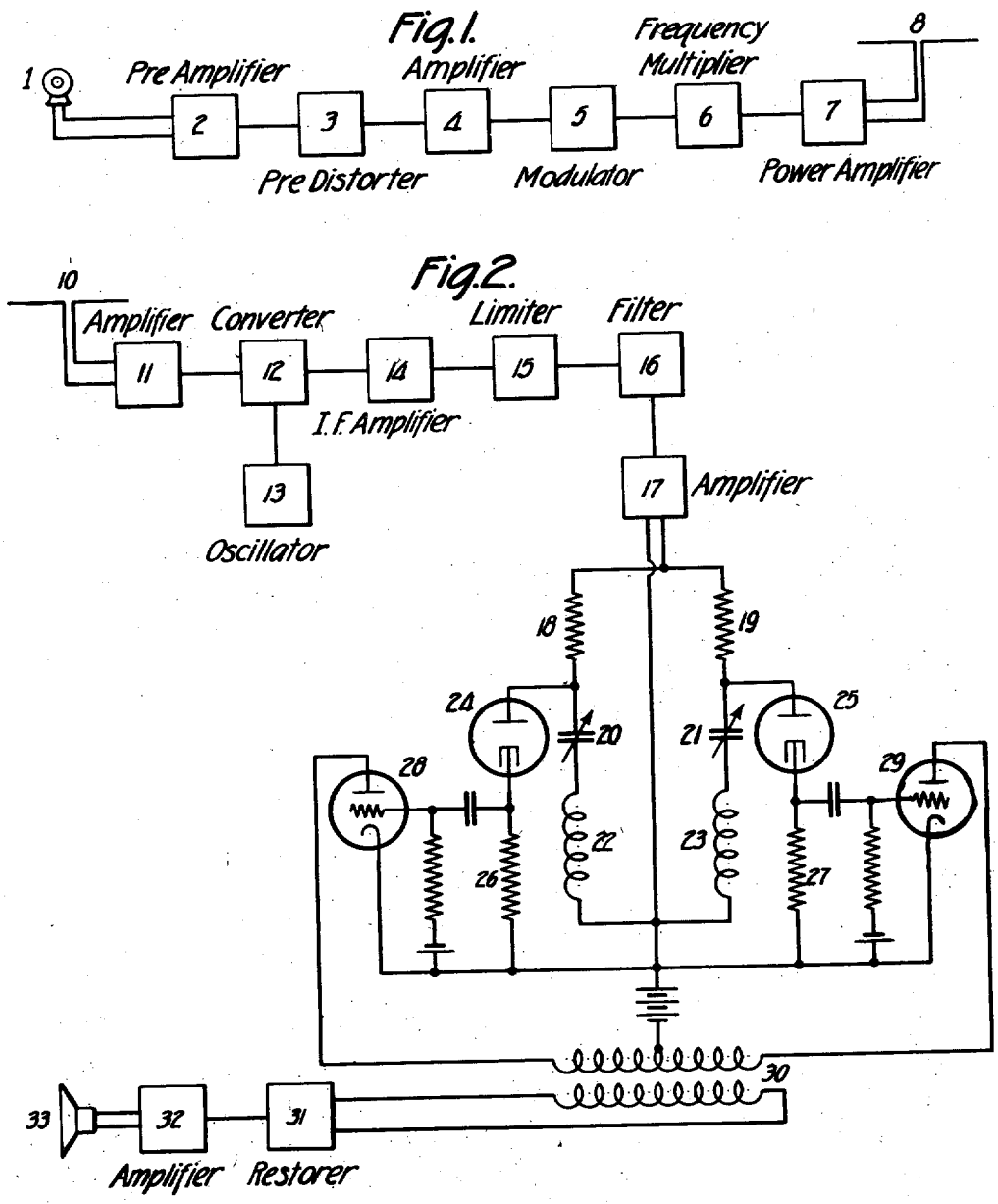
INVENTOR.
Edwin H. Armstrong
BY Moses & Nolte
ATTORNEYS

FREQUENCY MODULATION SIGNALING SYSTEM

Original Filed Feb. 19, 1940 6 Sheets-Sheet 2

Predistortion Network

Restorer Network

INVENTOR.
Edwin H. Armstrong

BY Moses & Nolte
ATTORNEYS

FREQUENCY MODULATION SIGNALING SYSTEM

Original Filed Feb. 19, 1940 6 Sheets-Sheet 3

INVENTOR.
Edwin H. Armstrong
BY Moses & Nolte
ATTORNEYS

INVENTOR.
Edwin H. Armstrong
BY Moses & Nolte
ATTORNEYS

FREQUENCY MODULATION SIGNALING SYSTEM

Original Filed Feb. 19, 1940 6 Sheets-Sheet 5

INVENTOR.
Edwin H. Armstrong
BY Moses & Nolte
ATTORNEYS

FREQUENCY MODULATION SIGNALING SYSTEM

Original Filed Feb. 19, 1940 6 Sheets-Sheet 6

INVENTOR.
Edwin H. Armstrong
BY Moses + Nolte
ATTORNEYS

Reissued Dec. 17, 1940 Re. 21,660

UNITED STATES PATENT OFFICE 21,660

FREQUENCY MODULATION SIGNALING SYSTEM

Edwin H. Armstrong, New York, N. Y.

Original No. 2,215,284, dated September 17, 1940, Serial No. 319,569, February 19, 1940. Application for reissue October 21, 1940, Serial No. 362,177

6 Claims. (Cl. 250—6)

This invention relates to improvements in frequency modulation transmision systems in radio signaling. It has for its object the improvement of the signal to noise ratio and the improvement of the quality of transmission. It is particularly useful for very high fidelity transmission of music. The invention relates to the introduction of a distorting network at the transmitter and a restoring network at the receiver together with the provision of certain detector characteristics in such manner as to produce a great improvement in the quality of transmission.

Figure 3:
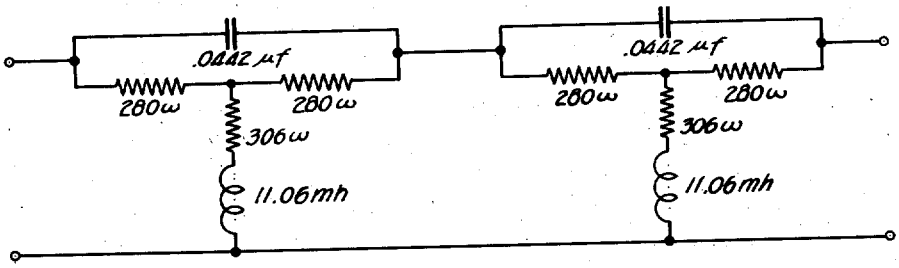
Figure 8:
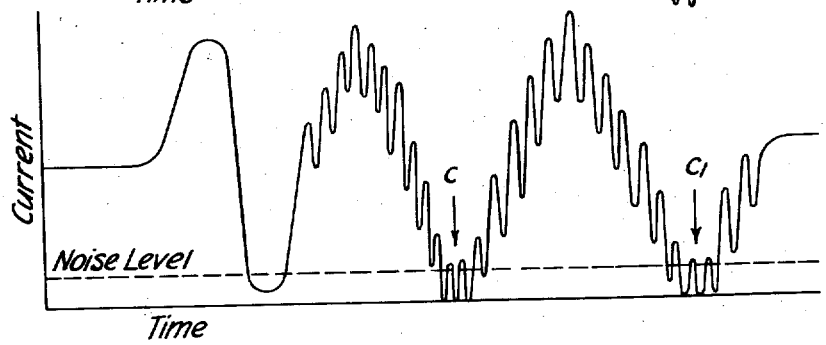
Figure 9:
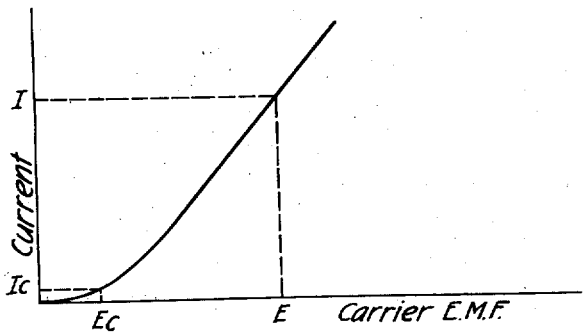
Figure 10:
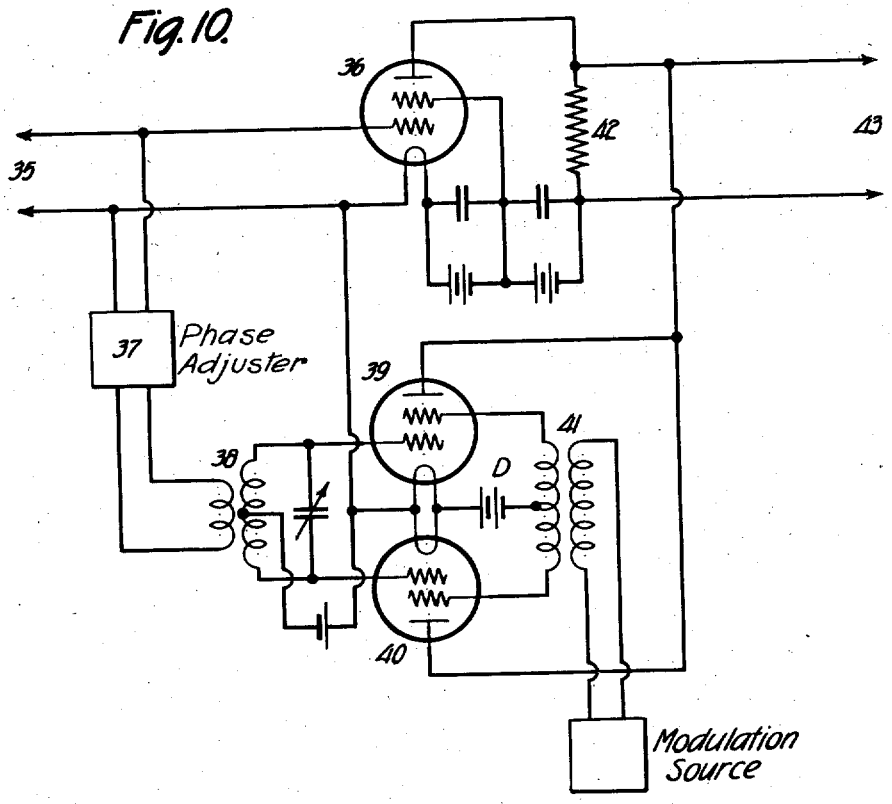
Figure 11:
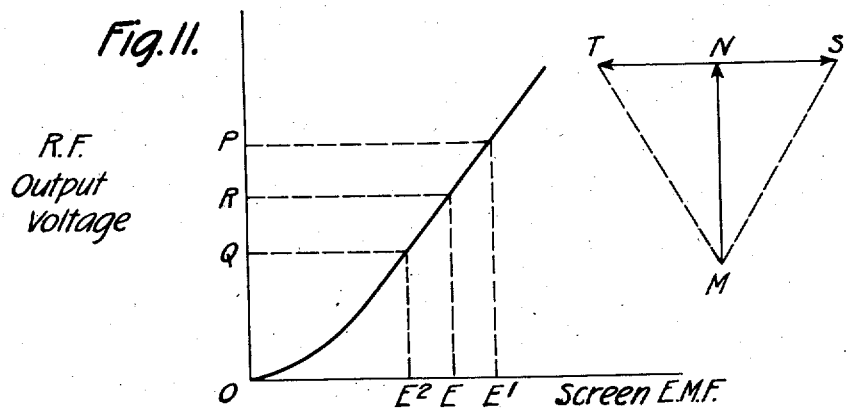
Figure 16:
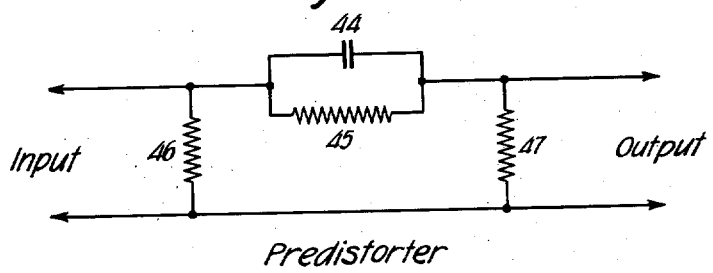
Figure 17:
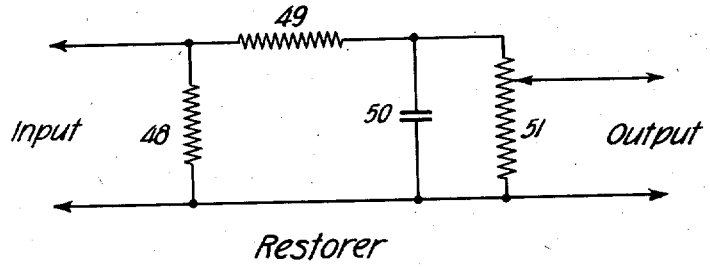

Referring now to the figures which form a part of this specification, Fig. 1 illustrates the general arrangement of the transmitter and Fig. 2 the general arrangement of the receiver. Fig. 3 illustrates the arrangement of a predistorting network used at the transmitter and Fig. 4 a restoring or converse network. Fig. 5 shows the electrical characteristics of these networks. Figs. 6, 7, 8 and 9 are a series of characteristics for the purpose of explaining certain operations occurring within the system. Fig. 10 illustrates the details of a modulating arrangement and Fig. 11 shows the characteristics of this arrangement. Figs. 12, 13, 14 and 15 illustrate some of the characteristic operations of the receiving system and Figs. 16 and 17 show a simplified form of the predistortion and restoring networks.

The difficulty which the invention proposes to overcome may be understood from the following explanation. It is well known that to produce realism in the reproduction of music that the total audible frequency range must be transmitted and reproduced. This range is from perhaps 30 or 40 cycles per second to 15,000 or 16,000 cycles per second. It is also well known that present radio practice falls far short of this, barely half of this range being transmitted and, for various reasons, less than half of this range being reproduced. It is also well known that in addition to failure to transmit the total frequency range that the present amplitude modulation methods introduce harmonics as a result of distortion in certain places in the transmitting and receiving systems. It is for these reasons that the present-day radio sets sound "like a radio."

It is also well known that when an attempt is made to transmit the higher frequencies of the musical range in the ordinary manner, the widening of the band width of the receiver to accommodate the higher frequencies of the transmitted wave results in the admission of much additional noise. It is well known that the distribution of the energy among the various frequency components of the voice or of an orchestra is such that the greater part of it is concentrated in the lower frequency range so that the higher frequencies are relatively much weaker than the lower ones. As a consequence of this when the transmitted wave is substantially fully modulated by the lower frequencies, the depth of modulation for the higher frequencies is relatively very small. Hence the higher frequencies are the first to be lost in the noise. It is well known that this difficulty can be remedied to a considerable extent by the introduction of a distorting network at the transmitter which is so designed that it raises the higher frequencies to substantially the same level as the lower ones so that they may more effectively override the noise and by the introducton of a converse or restoring network at the receiver which recreates the proper relation between the various frequency components of the transmission. It has been found that when this process is applied to a wide range frequency modulation system it produces a much greater gain than in an amplitude modulation system. It, however, greatly accentuates the distortion or creation of harmonics which has heretofore been referred to and produces a very unpleasant type of reproduction. It is the purpose of this invention to show how this difficulty may be avoided and the process applied to frequency modulation transmission with an improvement in both the fidelity and signal to noise ratio greater than can be obtained with the process as applied to the ordinary method of transmission.

Referring now to Fig. 1, which illustrates the general arrangement of the transmitter, 1 represents the microphone, 2 the usual preamplifier, 3 the predistorter, 4 an amplifier of the speech frequencies, 5 the modulator of a frequency modulation transmission sytem, 6 a series of frequency multipliers exciting a final power amplifier stage 7 which in turn feeds the radiating system 8. The frequency modulation transmitter components 5, 6 and 7 may be of the type described in my U. S. Patent #1,941,068.

Referring now to Fig. 2, 10 represents the receiving antenna, 11 an amplifier for the received current, and 12, 13 and 14 the usual converter, oscillator and intermediate frequency amplifier of a superheterodyne receiver. 15 represents a limiter for removing amplitude modulation, 16 a filter, and 17 and amplifier for the filter output. The networks 18, 20, 22 and 19, 21, 23 are for the purpose of converting frequency changes into amplitude changes and the circuit is similar to that described in my U. S. Patent #1,941,069. 24, 26 and 25, 27 represent detectors arranged across each half of the circuit, and 30 represents a balanced output transformer connecting into the restorer 31 the audio amplifier 32 and the speaker or other translating device 33.

Figure 4:
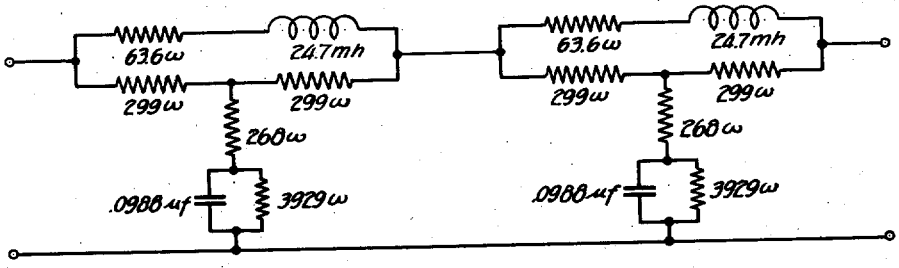
Figure 5:
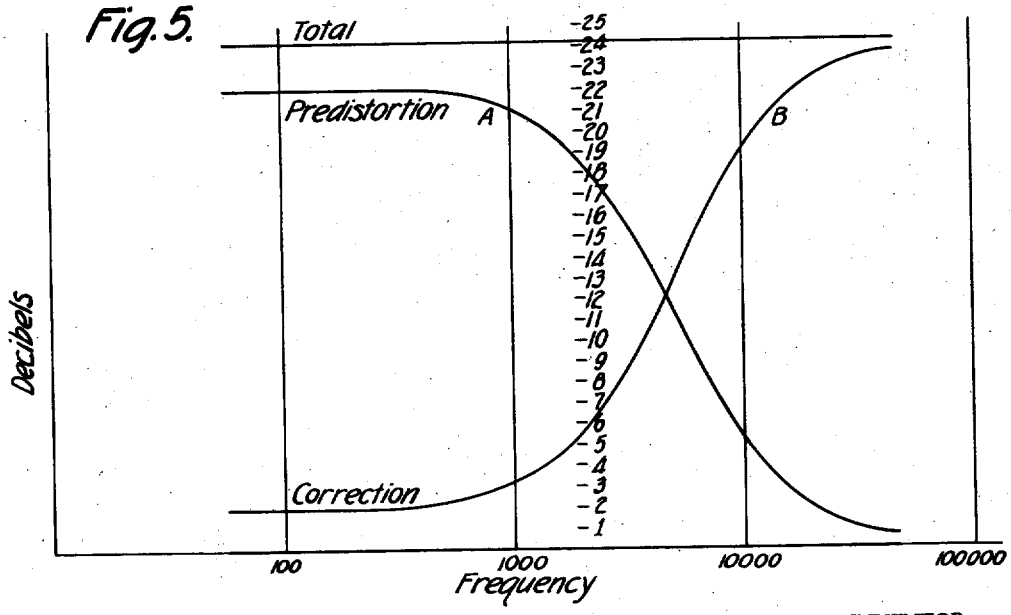
Figure 6:
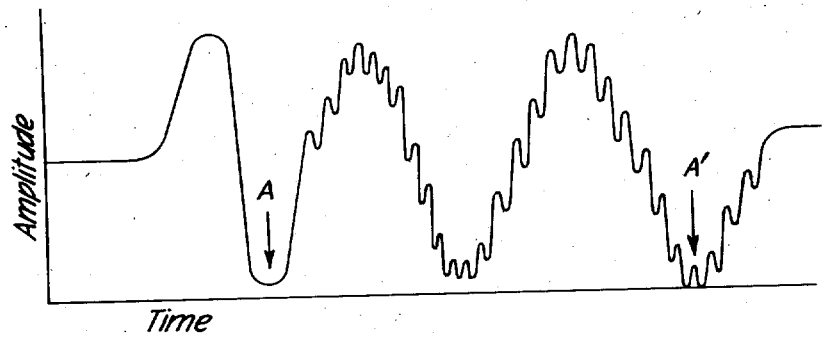
Figure 7:
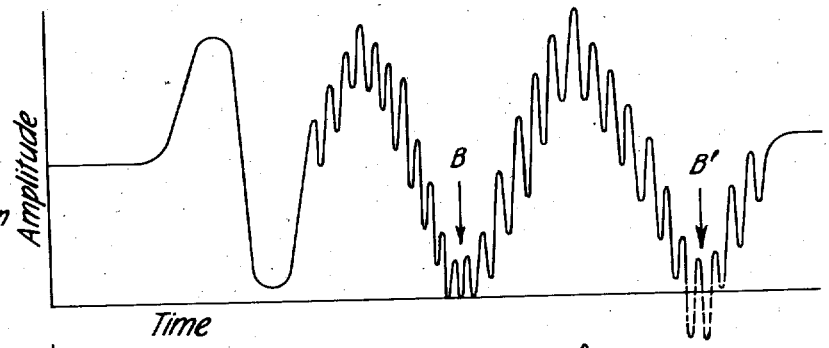
Figure 12:
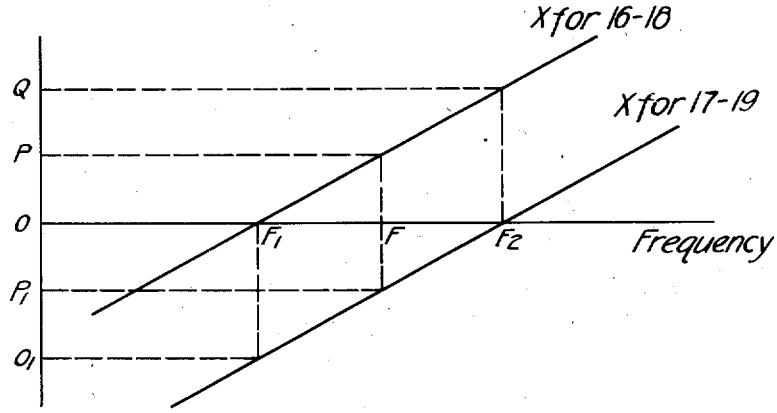
Figure 13:
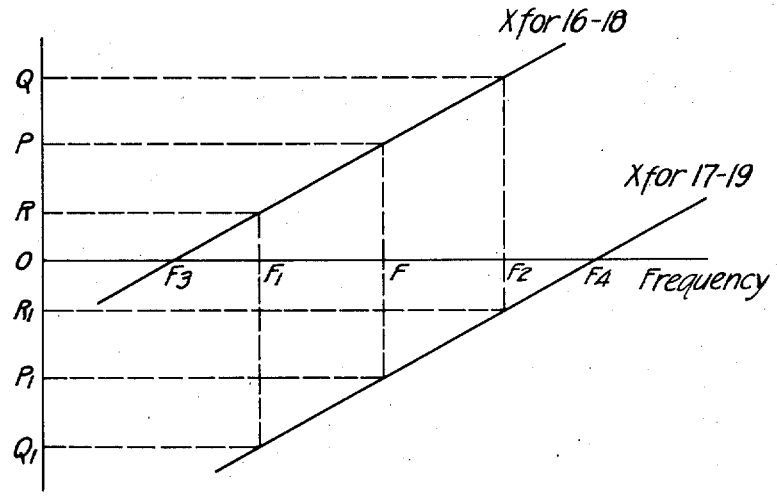
Figure 14:
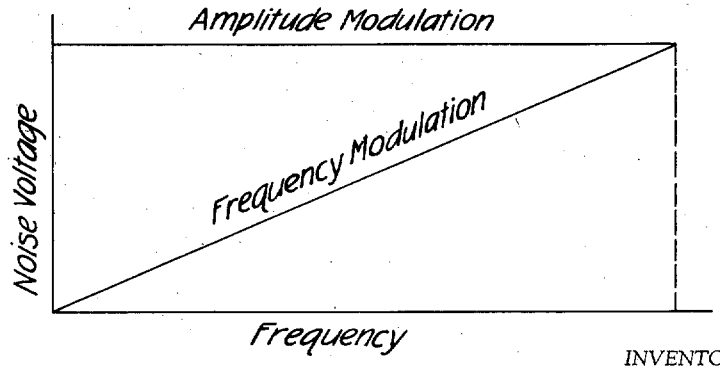
Figure 15:
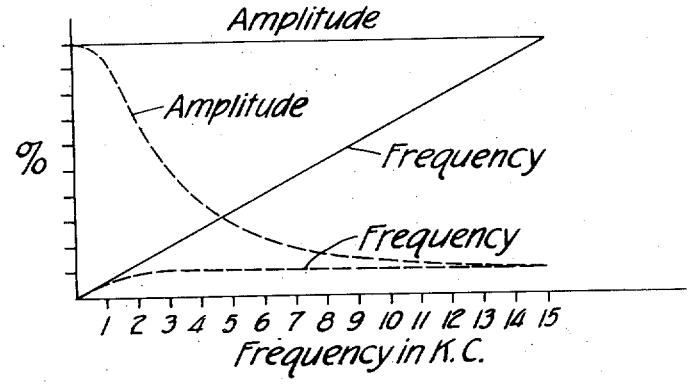

The circuits of the predistorter and restorer are illustrated respectively in Figs. 3 and 4. The transmission characteristics of these two networks are illustrated by curves A and B, respectively, in Fig. 5. As shown by curve A, the frequencies around 15,000 cycles are raised by the predistorter to some ten times the amplitude of the lowest frequencies, and in the restorer as shown by curve B these high frequencies are cut down an exactly similar amount so as to give an overall uniform transmission characteristic for transmitter and receiver. Fig. 6 shows the envelope of modulation as it appears in an amplitude modulation system at the transmitter under normal circumstances, and Fig. 7 shows the same characteristic as modified when predistortion is included in the transmission. Fig. 8 illustrates the envelope of the current in the detecting system, and Fig. 9 shows the current voltage curve of the ordinary detector. Fig. 10 shows the detailed circuit arrangement of the modulator 5 of Fig. 1, and Fig. 11 certain of its characteristics. Fig. 12 shows the characteristics of the networks 18, 20, 22 and 19, 21, 23 of Fig. 2 under one condition of adjustment, and Fig. 13 shows the characteristics of two networks having a somewhat different design. Fig. 14 illustrates the comparative noise voltage distribution with respect to frequency in the detector systems of an amplitude and frequency modulation receiver, respectively, and Fig. 15 shows the relative improvements which are obtained when the restorer is applied to the two systems.

It is now in order to consider the particular problem for which this invention furnishes a solution. Referring now to Fig. 6, there is illustrated the envelope of the modulation of an amplitude modulated transmitter. The curve shows the variation of the low frequency modulating voltage, the rather complex wave form indicating a deep low frequency modulation with a shallow modulation of higher frequency tones. It will be understood, of course, that this curve represents likewise the peak value of the radio frequency currents radiated. It is essential in amplitude modulation in order to produce the best signal to noise ratio to operate the transmitter as nearly as possible at full modulation. To accomplish this, the gain of the modulation amplifier is set so that the depth of the modulation approaches the zero line as closely as possible without actually touching it. Points A and A1 in Fig. 6 illustrate this condition.

In actual practice, of course, it is very difficult to prevent overmodulation even with the most careful supervision, and although the larger or low frequency modulations may be kept from overshooting the zero line the higher frequency ripples will at times inevitably overshoot it. This means distortion and the production of harmonics, particularly of the frequencies composing the ripples on the main modulation, and the value of these may reach relatively high levels with respect to the levels of the fundamental ripple frequencies. As a consequence of this, a disagreeable harsh tinge will be introduced in the sound reproduction. Now when predistortion is inserted in the modulating system so that the high frequency ripples are increased in amplitude relatively to the low frequency ones, this form of distortion is greatly aggravated. The general effect is as illustrated in Fig. 7, where points B and $B_1$ show the accentuation of the over modulation, and consequently of the distortion. The curves have been drawn in a way to illustrate extreme cases of distortion. It is, however, not necessary to actually overshoot the zero line to produce it. Distortion is likewise encountered when the depth of the modulation is such that nearly complete modulation is produced because the voltage-current curves of vacuum tube amplifiers or oscillators are not strictly linear but bend at their lower end, so that the envelope of the radio frequency current is not strictly proportional to the wave form of the modulating voltage. This type of distortion is almost always present, unless relatively low percentages of modulation are used.

At the receiving end various forms of distortion occur. A certain amount is due to lack of linear amplification but for the moment this may be disregarded in view of a more disturbing form. Fig. 8 shows the envelope of the radio frequency current in the rectifier or detector circuit. It will be observed from observation of the points C and $C_1$ that two forms of distortion may occur. One is that due to the lack of linearity of the detector characteristic as shown in Fig. 9, and the other is actual destruction of the form of the fine ripples by cross modulation with the noise components. The last form may be very bad indeed. In the application of the predistortion method to amplitude modulation it becomes necessary, therefore, to reduce the percentage modulation at the transmitter to prevent distortion. This results in a rise in the noise level so that the net theoretical gain of the system is substantially reduced.

Examining now the sources of distortion at the transmitting end of a frequency modulation system, particularly the phase shifting frequency multiplying type described in my U. S. Patent #1,941,068, it will be found that distortion due to lack of linearity in tube characteristics can be eliminated. Figs. 10 and 11 show how the distortion due to lack of linearity in the characteristics of the tubes used for modulating may be avoided. Fig. 10 shows a general form of phase shifter which may be used. 35 represents the source of exciting current which is applied to the grid of the carrier amplifier 36 and to the tuned circuit 38 through a phase adjusting network 37, so arranged that the E. M. F.'s applied to the grids of 39 and 40 are 90° out of phase from the E. M. F. applied to the grid of 36. The circuit 38 excites the grids of the balanced modulator 39, 40 differentially so that there is no output when no modulation is applied. The screen voltage is modulated by means of the transformer 41, the voltage being applied differentially so as to unbalance the modulator. Referring now to Fig. 11, which shows the relation between the screen voltage and the radio frequency voltage output, assume the normal voltage applied to the screens by the battery D to be OE. A change in the voltage of the screens will, according to the invention described in the #1,941,068 patent, add a voltage NS or NT at 90° phase displacement to the output voltage MN of the tube 36. The maximum voltage NS or NT required is about 50% of the voltage MN to give the maximum usable phase shift. Therefore, by properly designing the relative amplifications of the tubes 36 and 39, 40 it is possible to produce unbalanced voltages of such magnitude that only a small part of the characteristic curve of Fig. 11 is employed in the operation as, for example, a change in screen voltage from OE to $OE_1$, or $OE_2$. Since the curve is substantially straight over this range no transmitter distortion due to lack of tube linearity is encountered either without or with predistortion since there is no zero line or ceiling anywhere near the part of the curve which is utilized. Hence, in the modulating system of the frequency modulation transmitter described it is possible to eliminate completely that type of distortion described in the amplitude modulation case.

In the receiving system it is customary to make use of a balanced detector system as shown in Fig. 2. The reactance characteristics of the two detector branches are shown, respectively, in Fig. 12 arranged to produce 100% modulation over the range $F_1$—$F_2$. It will be observed that one branch is arranged to be non-reactive at $F_1$ and the other to be non-reactive at $F_2$, the extremes of the frequency swing. In this way the changes in frequency are converted completely into changes in amplitude.

It has been found that when this type of conversion system is used with a transmission which employs a predistorted output that bad distortion is encountered. This may be prevented as in amplitude modulation by a reduction of the percentage of modulation at the transmitter, with the resultant loss in the signal to noise ratio. However, I find that the transmitter adjustment may be left unchanged, the distortion removed, and the signal to noise ratio left unimpaired provided a characteristic as illustrated in Fig. 13 is employed. By designing the characteristics of the two branches so that the non-reactive points come at $F_3$ and $F_4$ which are outside the range of the frequency swing $F_1$ $F_2$ which is being used, complete freedom from distortion and cross modulation with noise components is secured. This is accomplished without any loss in the signal to noise ratio provided the noise is not greater than 50% of the signal. It is particularly valuable to be able to realize the full gain of predistortion because it is much more effective on the high frequency components in frequency modulation signaling than it is on amplitude modulation. The reason for this will appear from an examination of the noise characteristics of Fig. 14 which shows the relative voltage distribution of the noise components in frequency modulation and amplitude modulation reception. It will be observed that the noise distribution, which in the present case for purposes of illustration is assumed to be that due solely to thermal agitation and shot effect is uniformly distributed over the audible range while that in the frequency modulation system increases linearly from zero at zero frequency to the same value as the amplitude modulated receiver at the upper end of the band. Hence a restorer having such a characteristic as that of Fig. 4 will produce a very much greater reduction in the noise in the frequency modulation system than in the amplitude modulation one. The relative noise voltage-frequency characteristics which a restorer having the characteristics of Fig. 4 will give when applied to both systems is shown by the curves of Fig. 15. It will be observed that in the range of good audibility a large improvement in the reduction of the noise voltage is obtained. As the noise produced is proportional to the energy involved, or the square of these values, the importance of the improvement is apparent. While only one form of noise has so far been considered, namely, tube and circuit noise, the general result is the same for all sorts of disturbances such as ignition noise, commutating machinery noise, X-ray machines and the like. In practice on all these types of noise it has been found that very substantial aural improvement is realized.

It will be observed that the networks shown in Figs. 3 and 4 are somewhat complicated. While this is of no importance at a transmitting station, it does become of importance when a large number of receivers are to be constructed as the element of cost is quite important. Figs. 16 and 17 show simplified forms of networks which produce substantially the same characteristics as those shown in Figs. 3 and 4. In the predistorter while a relatively large range of values may be chosen from, I find the following set to be practical and inexpensive. The capacity 44 has a value of .001 microfarad and the resistance 45 is 75,000 ohms. The input resistance 46 should be 300 ohms and the output resistance 47 should be 3000 ohms.

In the restorer shown in Fig. 17, 48 represents the detector output impedance and may be of the order of 100,000 ohms. 49 is a resistance of 50,000 ohms and 50 a capacity of .001 microfarad. The volume control potentiometer 51 should have a resistance of the order of 500,000 ohms.

I have described what I believe to be the best embodiments of my invention. I do not wish, however, to be confined to the embodiments shown, but what I desire to cover by Letters Patent is set forth in the appended claims.

I claim:

1. The method of transmitting and reproducing a band of signaling frequencies which consists in amplifying the high frequencies of the band to a substantially greater degree than the low frequencies thereof, varying the frequency of the wave to be transmitted by the amplified currents to produce a wide band of frequency variations, transmitting such wave, receiving the wave and amplifying the received currents, passing the amplified currents through a detecting device having an admittance band substantially wider than said wide band of frequency variations and translating in the detecting device the frequency variations into a band of currents of variable amplitude whereby distortions which arise in the translation in the detecting device of the frequency variations into currents of variable amplitude are minimized, and amplifying the low frequency currents of said band to a substantially greater degree than the high frequency currents thereof.

2. In a system for transmitting and reproducing a band of signaling currents, in combination, means arranged to amplify the high frequency currents of the band to a substantially greater degree than the low frequency currents thereof, means for generating a carrier wave of substantially constant frequency, means for causing the amplified currents to vary over a wide range the frequency of the carrier wave, means for transmitting such wave, means for receiving the wave and amplifying the received currents, means coupled to said last-named means for converting the frequency variations into a band of currents of variable amplitude and having an admittance band width substantially greater than the width of the said wide range of carrier frequencies, a detecting device coupled to said converting means for deriving the band of modulation currents, and amplifying means coupled to the detecting device arranged to amplify the low frequency currents of the band to a substantially greater degree than the high frequency currents thereof to reproduce the signaling currents whereby distortions which arise in the translation in the converting means of the frequency variations into currents of variable amplitude are minimized.

3. The combination as set forth in claim 2 in which the means for converting the frequency variations into currents of variable amplitude comprises two parallel paths, one of said paths including a circuit having a resonant frequency lower than the lowest frequency of the transmitted band of frequencies and the other of said paths including a circuit having a resonant frequency higher than the highest frequency of the transmitted band.

4. A receiver adapted to receive a wide swing frequency modulated wave predistorted in such manner that the ratio of the deviations of the wave to the amplitudes of the corresponding signaling currents is greater for the higher frequencies of the signaling currents than for the lower frequencies thereof, said receiver comprising means for receiving the wave and amplifying the received currents, converting means coupled to said last-named means for causing the frequency variations to creat currents of variable amplitude and having an admittance band width substantially greater than the width of the wide swing of said wave, a detecting device coupled to said converting means for deriving the signaling currents therefrom, and amplifying means coupled to the detecting device arranged to amplify the signaling currents of the lower frequencies to a substantially greater degree than the signaling currents of the higher frequencies.

5. A receiver as set forth in claim 4 in which the means for converting the frequency variations into currents of variable amplitude comprises two parallel paths, one of said paths including a circuit having a resonant frequency lower than the lowest frequency of the transmitted wave and the other of said paths including a circuit having a resonant frequency higher than the highest frequency of the transmitted wave.

6. The method of reproducing the signaling frequencies of a wide swing frequency modulated wave predistorted in such manner that the ratio of the deviations of the wave to the amplitudes of the corresponding signaling currents is greater for the higher frequencies of the signaling currents than for the lower frequencies thereof, which method consists in receiving the wave and amplifying the received currents, passing the amplified currents through a detecting device having an admittance band substantially wider than the width of the wide swing of the said wave and translating in the detecting device the frequency variations into signaling currents of variable amplitude, whereby distortions which arise in the translation in the detecting device of the frequency variations into currents of variable amplitude are minimized, and amplifying the signaling currents of the lower frequencies to a substantially greater degree than the signaling currents of the higher frequencies.

EDWIN H. ARMSTRONG.